United States Patent
Blasini et al.

(10) Patent No.: US 8,790,748 B2
(45) Date of Patent: Jul. 29, 2014

(54) POLYMER MODIFIED BITUMEN CAP SHEETS AND METHODS

(71) Applicant: Johns Manville, Denver, CO (US)

(72) Inventors: Daniel R. Blasini, Edgewater, CO (US); Joel Hazy, Brighton, CO (US)

(73) Assignee: Johns Manville, Denver, CO (US)

( * ) Notice: Subject to any disclaimer, the term of this patent is extended or adjusted under 35 U.S.C. 154(b) by 0 days.

(21) Appl. No.: 13/692,093

(22) Filed: Dec. 3, 2012

(65) Prior Publication Data
US 2014/0154411 A1 Jun. 5, 2014

(51) Int. Cl.
 *B05D 1/12* (2006.01)
 *B05D 3/12* (2006.01)

(52) U.S. Cl.
 USPC ............... 427/186; 427/188; 427/359

(58) Field of Classification Search
 USPC .......................... 427/186, 188, 359
 See application file for complete search history.

(56) References Cited

U.S. PATENT DOCUMENTS

| | | | | |
|---|---|---|---|---|
| 5,380,552 A | * | 1/1995 | George et al. | 427/186 |
| 6,933,007 B2 | * | 8/2005 | Fensel et al. | 427/186 |

* cited by examiner

*Primary Examiner* — Frederick Parker
(74) *Attorney, Agent, or Firm* — Robert D. Touslee

(57) ABSTRACT

According to one embodiment, a method for pressing roofing granules into a roofing membrane may include providing a roofing membrane and applying roofing granules atop a surface of the membrane. The method may also include adjusting a position of a second roller relative to a first roller so as to vary an amount of contact between the membrane and the first roller and pressing the roofing granules into the membrane via the first roller. In some embodiments, a line speed of the membrane may be determined and a contact value may be calculated based on the line speed of the membrane. The contact value may represent an effective amount of contact between the membrane and the first roller. The position of the second roller may be adjusted so that the amount of contact between the membrane and the first roller corresponds to the effective amount of contact.

11 Claims, 6 Drawing Sheets

POLYMER MODIFIED BITUMEN CAP SHEETS AND METHODS

BACKGROUND OF THE INVENTION

It is often desirable to apply roofing granules to roofing membranes by pressing the granules into a surface of the membranes. The granules are typically applied for various aesthetics and/or functional purposes, such as to provide ultraviolet (UV) protection and/or foot traffic protection for the asphalt and underlying membrane. Conventional granule application processes typical involve passing a roofing membrane and granules through a pair of press rollers to mechanically force the granules into the roofing membrane. The press rollers are typically small in diameter and apply a single point pressure to the roofing membrane and granules to force the granules into the roofing membrane.

This conventional process, however, is often less effective at pressing granules into roofing membranes that exhibit elastic behavior because the elastic behavior of such materials often causes the roofing membrane to deflect under the instant point load applied by the press rollers during the granule pressing process. This deflection may cause the roofing membrane to elastically rebound or return to an original position and force the granule out of a temporary pocket that is created by or during the granule pressing process. The result may be that a substantial portion of the granules do not properly adhere to the roofing membrane, which may instantly or quickly fall off as minor loads are applied to the roofing membranes and granules, such as by an object rubbing against the granules.

BRIEF SUMMARY OF THE INVENTION

Embodiments of the invention describe methods, systems, and apparatus, which improve granule adhesion in roofing membranes. According to one aspect, a method for pressing roofing granules into a thermoplastic-rubber roofing membrane is provided. According to the method, a thermoplastic rubber material is provided. The thermoplastic rubber material is then heated and extruded to form a membrane having a first surface and a second surface opposite the first surface. Roofing granules are then applied atop the first surface, which are to be pressed into the membrane. In relation to pressing the granules, a contact angle is calculated that represents an effective amount of contact between the thermoplastic rubber membrane and a press roller. The contact angle may be calculated based on a line speed of the thermoplastic rubber membrane, based on an angular frequency of the press roller, based on a radius of the press roller, and the like. The contact between the thermoplastic rubber membrane and the press roller may then be adjusted or varied so that the contact corresponds to the calculated effective amount of contact. According to some embodiments, the contact between the thermoplastic rubber membrane and the press roller may be adjusted or varied by adjusting a position of a second roller relative to the press roller. The roofing granules are then pressed into the first surface of the thermoplastic rubber membrane via the press roller.

According to another aspect, a method for pressing roofing granules into a roofing membrane is provided. According to the method, a roofing membrane is provided. Roofing granules are applied atop a surface of the roofing membrane for subsequent pressing into the roofing membrane. A position of a second roller (i.e., positioning roller) relative to a first roller (i.e., press roller) is adjusted to vary an amount of contact between the roofing membrane and the first roller. The roofing granules are then pressed into the roofing membrane via the first roller.

In some embodiments, the method may also include the steps of: determining a line speed of the roofing membrane through a granule press system, calculating a contact value based on the line speed of the roofing membrane where the contact value represents an effective amount of contact between the roofing membrane and the first roller, and adjusting the position of the second roller so that the amount of contact between the roofing membrane and the first roller corresponds to the effective amount of contact. In some embodiments, the method may further include the steps of: determining an angular frequency of the first roller and calculating the contact value based additionally on the angular frequency of the first roller.

According to another aspect, a method for determining a contact angle for pressing roofing granules into a roofing membrane is provided. According to the method, a radius of a press roller is determined. The press roller may be used to press roofing granules into the roofing membrane. An angular frequency of the press roller is also determined. A line speed of the roofing membrane through a granule pressing system is similarly determined and the contact angle is calculated based on the radius of the press roller, the angular frequency of the press roller, and/or the line speed of the roofing membrane. The contact angle defines an amount of contact between the roofing membrane and the press roller that effectively press roofing granules into the roofing membrane. In some embodiments, the angular frequency of the press roller may be determined based on a temperature of the roofing membrane.

According to another aspect, a system for pressing granules into a roofing membrane is provided. The system includes a granule application device that is positionable above a top surface of a roofing membrane and that is configured to dispense roofing granules onto the top surface of the roofing membrane. The system also includes a first roller that is positionable along a path of the roofing membrane through the system and that is configured to press the roofing granules into the roofing membrane. The system further includes a second roller that is positionable along the path of the roofing membrane and that is configured to be adjusted relative to the first roller to vary an amount of contact between the roofing membrane and the first roller. According to some embodiments, the second roller may be adjusted based on a line speed of the roofing membrane through the system, based on an angular frequency of the first roller, based on a radius or diameter of the first roller, and the like.

In some embodiments, the second roller is positioned immediately adjacent the first roller along the path of the roofing membrane. In some embodiments, the second roller is linearly adjustable relative to the first roller. In some embodiments, the second roller wraps the roofing membrane around at least a portion of the first roller or unwraps the roofing membrane therefrom.

In some embodiments, the first roller has a radius of between about 0.25 and 0.75 meters, or of about 0.5 meters. In some embodiments, the second roller is configured to vary the amount of contact between the roofing membrane and the first roller by between about 60 and 120 degrees (between 1.04 and 2.09 radians). In other embodiments, the second roller is configured to vary the amount of contact between the roofing membrane and the first roller by between about 75 and 105 degrees (between 1.30 and 1.83 radians). In yet other embodiments, the second roller is configured to vary the amount of contact between the roofing membrane and the first roller by between about 85 and 95 degrees (between 1.48 and 1.66 radians).

BRIEF DESCRIPTION OF THE DRAWINGS

The present invention is described in conjunction with the appended figures.

Figure 1:
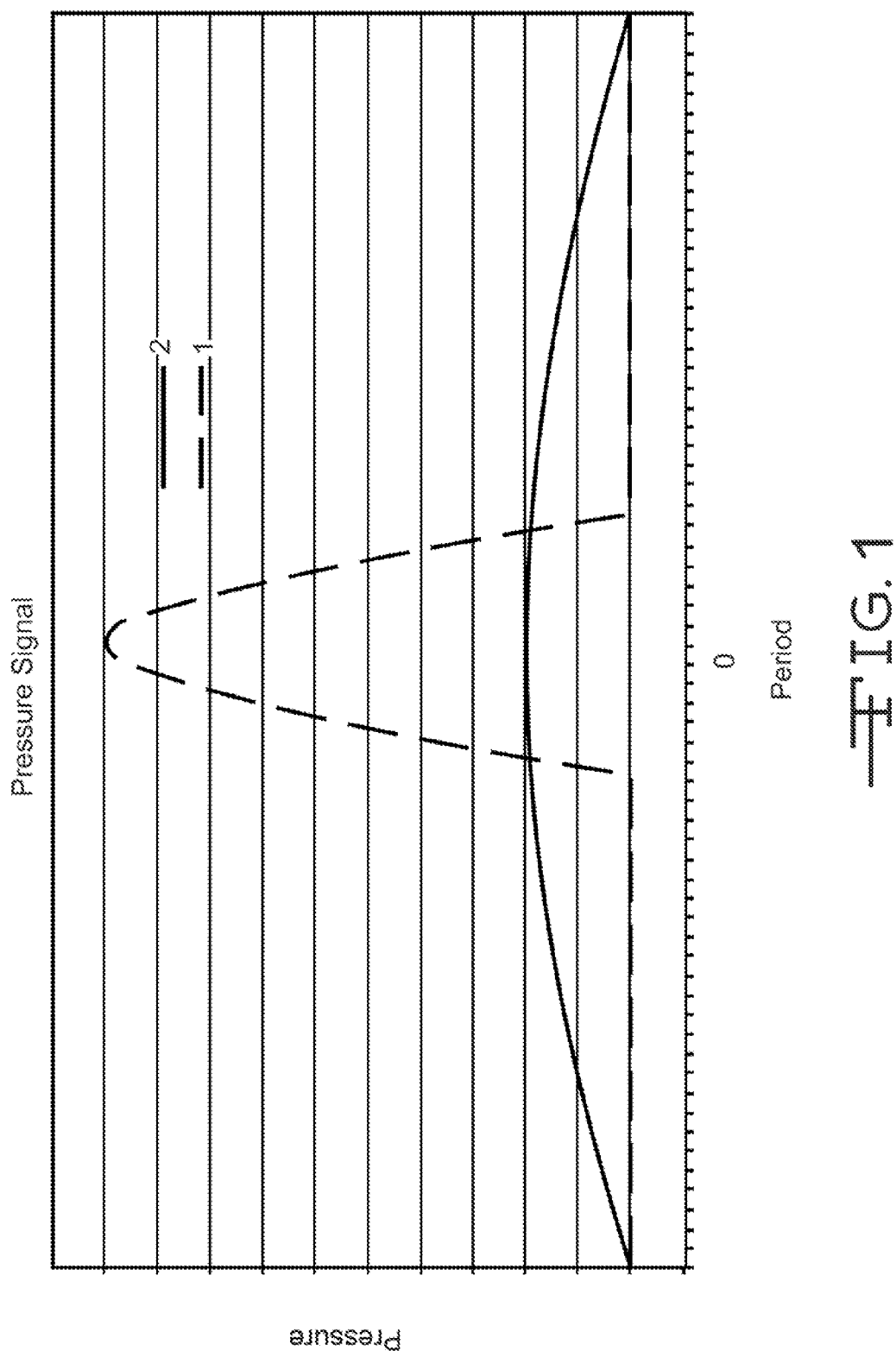
FIG. 1 illustrates a graph showing a measured pressure applied during a granule pressing operation according to an embodiment of the invention.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION OF THE INVENTION

The ensuing description provides exemplary embodiments only, and is not intended to limit the scope, applicability or configuration of the disclosure. Rather, the ensuing description of the exemplary embodiments will provide those skilled in the art with an enabling description for implementing one or more exemplary embodiments. It being understood that various changes may be made in the function and arrangement of elements without departing from the spirit and scope of the invention as set forth in the appended claims.

The description here refers generally to viscoelastic roofing materials, which may include SBS Modified Bitumen Roofing Membranes, polymer modified asphalt, rubber modified asphalt, thermoplastic rubbers, modified thermoplastic rubbers, and the like. These materials are often cap sheets that include a combination of asphalt, polymer, and one or more fillers. The materials are typically applied atop a roofing system to protect underlying layers from rain, sun exposure, foot traffic, and the like. These roofing materials may include any material that exhibits both plastic and elastic behaviors and are not necessarily limited to one type. For example, these materials may exhibit plastic behavior at elevated temperatures and elastic behavior at lower temperatures. Since these materials may exhibit behaviors, the methods and procedures for manufacturing or working with these materials may need to be slightly adjusted compared with conventional processes. As described herein, one manufacturing process that may be more difficult due to the unique properties of these materials is applying granules to a surface of the membranes.

Embodiments of the invention describe methods and apparatus, which improve granule adhesion in such roofing materials. In particular, the embodiments described herein improve granule adhesion in viscoelastic material roofing membranes, such as SBS Modified Bitumen Roofing Membranes, thermoplastic rubbers, modified thermoplastic rubbers, polymer modified asphalt, rubber modified asphalt, and the like (hereinafter viscoelastic roofing membranes or granulated modbit membrane). As described herein, these materials are typically characterized by having properties similar to both plastics and rubbers. For example, these materials may exhibit elastic properties when subjected to instant forces and exhibit plastic properties when the forces are more delayed. The materials behavior may depend on the temperature of the material. For example, the material may flow and exhibit plastic behavior typical of polymers at higher temperatures and exhibit elastic behavior typical of rubbers at lower temperatures.

An example of a well-known viscoelastic material is commonly known as silly Putty®. If silly putty is subjected to an instant stress or force, like being thrown against the ground, the material will bounce or elastically rebound. On the other hand, if the material is subjected to a relatively long stress or force, such as leaving the material on a flat table, the material will flow and puddle. In this manner, the material is not a traditional solid or liquid, but exhibits behaviors of both depending on the stress or force applied.

Like many roofing membranes, it may be desirable to apply roofing granules to a surface of viscoelastic roofing membranes by pressing the granules into a surface of the membranes. The granules are typically applied for aesthetics and/or functional purposes, such as to provide ultraviolet (UV) protection and foot traffic protection for the asphalt and underlying membrane. For example, the asphalt may decay with UV exposure and may also decay with foot traffic. The granules protect the underlayment from such decay or delay the decaying process. Conventional granule application processes typical involve applying asphalt to a viscoelastic material mat and applying or dropping granules atop the asphalt and mat. The mat, asphalt, and granules are then passed through a pair of press rollers, which are typically small in diameter and apply a single point pressure on the material to mechanically force the granules into the roofing membrane. Adjustments to conventional pressing operations include increasing or decreasing a line speed of the operation, or adjusting the point pressure applied by the pair of press rollers. This conventional process works well for materials that exhibit plastic behavior, such as APP modified bitumen and oxidized asphalt roofing membranes, because these materials readily deform as the granules are pressed into the materials.

A particular problem with applying roofing granules to viscoelastic roofing membranes, however, is that these materials exhibit elastic behavior characteristic similar to rubber materials as the roofing membrane cools. The elastic behavior causes the roofing membrane to deflect under the instant point load applied by the press rollers during the granule adhesion process. The roofing membrane may then rebound or elastically return to position and force the granule out of a temporary pocket created by the point load. As such, a significant portion of the granules may not properly adhere to the roofing membrane and may instantly fall off, or quickly fall off as minor loads are applied to the granules, such as by an object brushing past the granules.

One method in which the elastic behavior of the viscoelastic material may be accounted for is by raising the temperature of the material prior to extrusion of the material. A potential problem with raising the material's temperature, however, is that the increased temperature may lead to cross-linking the polymers. Additionally, at elevated temperatures, the viscoelastic membrane may exhibit increased plastic behavior. In these instances, the viscoelastic material may be too soft, which causes the material to surround the granule and encapsulate the granules as the granules are pressed into the material. This may lead to problems such as stick ups or bleed through of the asphalt.

In some embodiments, the temperature of the viscoelastic material may vary due to variations in the environmental temperature, the temperature of the material during manufacturing, the speed of extrusion of the material, and the like. Due to these variations, the temperature of the viscoelastic membrane during the granule pressing operation may vary, which may result in the membrane varying between elastic and plastic behaviors during the granule pressing operation. Accordingly, a granule pressing operation that is designed for a given behavior of the membrane (i.e., either plastic or elastic) may inadequately press the granules as the behavior of the membrane varies. For example, if the granule pressing operation is designed based on a plastic response of the viscoelastic membrane, the granules may not be adequately pressed into the membrane when the membrane exhibits elastic behaviors, and vice versa.

The embodiments described herein optimize the granule adhesion in viscoelastic roofing materials by adjusting the granule pressing time and/or heat of the roofing materials. For example, the amount of time the granules are pressed into the membrane may be adjusted based on the temperature of the viscoelastic roofing material so as to compensate for whether the material is exhibiting predominantly elastic or plastic behavior. In one embodiment, the methods and systems described herein are especially advantageous in pressing granules into materials exhibiting an elastic behavior. In such embodiments, granule adhesion is improved by pressing the granules in a manner that relaxes the material and allows the material to flow around the pressed granules. For example, the "dwell time" of the granule pressing operation, or in other words an amount of time the granules are pressed into the viscoelastic material, may be increased so that the viscoelastic material is able to relax and flow around the granules in a more plastic manner. Stated differently, in one embodiment, the pressure applied to the granules is more evenly applied and applied over a longer duration to allow the material to relax some of the stress and flow around the granule, which results in increased granule adhesion.

Applying the granule pressure in this manner also allows the viscoelastic material to flow around the granules and create a good seal. Creating a good seal encapsulates the bottom of the granule, which prevents water from flowing between the material and granule and eroding the glass in the granules, which otherwise results in poor granule adhesion.

The embodiments described herein also allow the granule pressing operation to be varied based on the temperature of the viscoelastic material so as to account for an increased elastic or plastic behavior of the material. For example, the "dwell time" of the granule pressing operation may be extended or lengthened when the viscoelastic material is cooler to account for a likely increase in elastic behavior of the material. Likewise, the dwell time of the granule pressing operation may be shortened when the viscoelastic material is warmer to account for a likely increase in plastic behavior of the material. In this manner, the granule pressing operation may be optimized based on the viscoelastic material's temperature so that the stick up, bleed through, and elastic rebound issues as described herein are minimized.

The embodiments described herein further allow the granule pressing operation to be varied based on the specific properties of the viscoelastic material so as to account for a measured or determined elastic or plastic behavior of the material. For example, the "dwell time" of the granule pressing operation may be extended or shortened based on the measured or determined plastic or elastic behavior of the material. If the material is measured or determined to exhibit more plastic behavior, the dwell time may be shortened to minimized bleed through and stick up issues. If the material is measured or determined to exhibit more elastic behavior, the dwell time may be lengthened to minimize elastic rebound issue and properly adhere the granules to the viscoelastic material. Having described embodiments of the invention generally, additional features will be more evident with references to the figures described below.

Referring now to FIG. 1, illustrated is a graph showing a measured pressure applied during a granule pressing operation. The dashed line labeled 1 shows the pressure applied during a conventional pressing operation using press rollers that apply a single point load. As shown by line 1, the pressure applied to the roofing material is essentially zero until the press rollers are encountered. As the material and granules pass through the press rollers, a relatively high and instant force is applied. As can be readily understood, when such a pressure is applied to a membrane that exhibits an elastic response, the membrane absorbs the pressure, such as by creating a pocket in which the granules sits, and rebounds to force the granule out of the pocket.

The solid line labeled 2 shows the pressure applied during a pressing operation according to embodiments of the invention. As shown by line 2, the pressure applied to the roofing material is applied in a relatively even manner and over a significantly longer duration compared with the pressing operation of line 1. The maximum pressure amplitude applied may also be below the pressure applied during the pressing operation of line 1, although the pressure amplitude may be varied to be at or near the pressure of line 1 depending on the specifics of the pressing operation and/or viscoelastic material properties. Similarly, the duration of the pressure application may be varied based on the temperature or other characteristics of the viscoelastic material as described herein.

Figure 2:
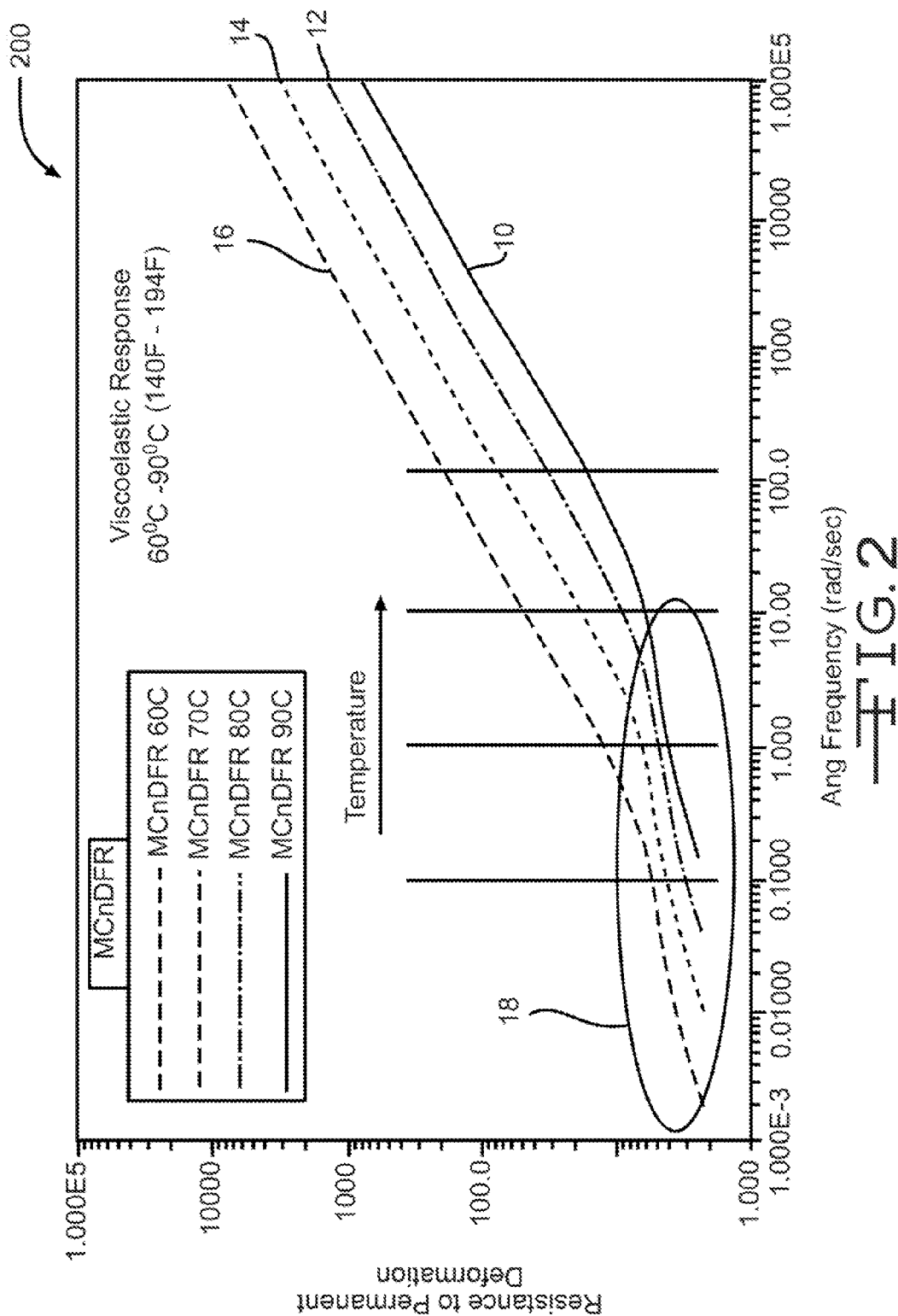
FIG. 2 illustrates a graph showing a dynamic mechanical analysis (DMA) frequency-temperature response of a styrene-butadiene-styrene (SBS) modified bitumen roofing membrane according to an embodiment of the invention.

Referring now to FIG. 2, illustrated is a graph 200 showing a dynamic mechanical analysis (DMA) frequency-temperature response of a styrene-butadiene-styrene (SBS) modified bitumen roofing membrane. Specifically, graph 200 shows the materials resistance to deformation as a result of temperature and pressure application duration. The pressure application duration is shown as an angular frequency (rad/sec) or angular velocity, which corresponds to the speed at which a pressure application wheel is turned. Lower angular frequency values correspond to slower speeds for the pressure application wheel. Higher angular frequencies (e.g., those illustrated on the far right of graph 200) may correspond to single pressure point processes while lower angular frequencies (e.g., those illustrated on the left side of graph 200) correspond to the extended pressure application processes described herein. The resistance to permanent deformation may be considered as a modulus of the material that takes into account any phase lag times, with higher values representing an increased resistance to permanent deformation. The phase lag in some material may be about 0 and 45 degrees from the applied pressure.

Graph 200 includes 4 plots 10-16. The plots are for a single viscoelastic material at roughly 4 different temperatures. Specifically, line 10 is for a viscoelastic material at roughly 90° Celsius, line 12 is for the viscoelastic material at roughly 80° C., line 14 is for the viscoelastic material at roughly 70° C., and line 16 is for the viscoelastic material at roughly 60° C. As seen in graph 200 as the material cools from roughly 90° C. to 60° C., the resistance to deformation increases at any particular angular frequency. This is due to the material exhibiting a more solid or elastic behavior where the material rebounds to some degree from an applied pressure.

As also shown in graph 200 as the angular frequency decreases (i.e., as the pressure application wheel speed is decreased), the resistance to permanent deformation also decreases. This is due to the viscoelastic material exhibiting a more viscous behavior where the material relaxes and flows in response to the applied pressure. Stated differently, as the dwell time of the pressure application process is increased, the material is more prone to plastic deformation and the amount of "pushback" or rebound exhibited by the viscoelastic material is decreased. The extended dwell time of the pressure application process effectively drives granules into the viscoelastic roofing material.

As can be readily understood with reference to graph 200, the ideal "processing window" for a granule adhesion pressing operation is one that occurs at higher temperatures and/or at lower frequencies, where the viscoelastic roofing membrane will exert or exhibit less resistance to the press rollers. As graph 200 also shows, at lower angular frequencies the roofing membrane's behavior is less dependent on the membrane's temperature. Stated differently, at lower angular frequencies, the membrane tends to act more uniformly even at different temperatures. As a result, the granule adhesion sensitivity to membrane temperature and viscosity variations is reduced at lower angular frequencies. Stated differently, at lower angular frequencies, the granule pressing operation is more uniform and less prone to temperature and viscosity variations. As such, embodiments of the invention described herein generally describe granule pressing operation where the angular frequency is relatively low.

The circled range 18 on graph 200 illustrates a range of angular frequencies where the resistance to permanent deformation is sufficient low so as to allow adequate adhesion of roofing granules with viscoelastic materials. The range includes angular frequencies of about 10 rad/sec and less. At this angular frequency (i.e., 10 rad/sec), resistance to deformation is typically low enough so that the granule pressing operation results in effective granule adhesion. As shown in the graph, the 10 rad/sec is more effective for higher temperature viscoelastic membranes (i.e., 90° C.) and much less effective for lower temperature membranes (i.e., 60° C.). In one embodiment, the angular frequency may range from about 0.010 to 3 rad/sec or from about 0.10 to 2 rad/sec. In a specific embodiment, the angular frequency may range from about 1.0 to 2.0 rad/sec. In these lower angular frequency ranges, the viscoelastic membrane's temperature affects the resistance to deformation less and thus, affects the granule adhesion process less.

To achieve the desired angular frequency, the contact angle ($\theta$) between the viscoelastic membrane and the press roller may be increased, which results in an increase in the granule press dwell time. This in turn decreases the frequency ($\omega$) of the granule press pressure signal as described with reference to FIG. 3. The contact angle ($\theta$) may be adjusted to optimize the frequency ($\omega$) of the granule press signal frequency for a particular line speed (v). The below equation describes the parameters of the granule press pressure signal and its relation to the line speed (v).

$$\theta = \frac{2\pi v}{r\omega}$$

In the above equation, ($\theta$) is the contact angle of the granulated modbit membrane with the press roller, (r) is the radius of the press roller, (v) is the line speed and ($\omega$) is the angular frequency of the granule press pressure signal (it is inversely proportional to the granule press dwell time). As shown in FIG. 1, conventional granule press operations produce sharp high frequency ($\omega$) pressure signals at the granule press rollers. The frequency of this pressure signal is directly proportional to the line speed (v). The amplitude is controlled by the force exerted by the pressure rollers. In contrast, the frequency ($\omega$) of the granule press pressure signal generated by the embodiments described herein is tunable by means of the contact angle ($\theta$) and can be made independent of the line speed (v) as shown in the above equation. The amplitude of the pressure signal can be controlled by adjusting the line tension on the membrane.

In some embodiments, the press roller radius (r) will be constant and based on the specific design of the pressing operation. The frequency ($\omega$) may be selected at an optimum point based on the viscoelastic properties of the polymer modified coating. The frequency ($\omega$) will typically fall within the above described ranges, although values outside of this range are possible, and may be based on the membranes frequency response at varying temperatures as measured by dynamic mechanical analysis (DMA). The required contact angle ($\theta$) may then be calculated based on the desired frequency ($\omega$) and line speed (v).

For example, considering graph 200 required contact angle ($\theta$) may be calculated based on a desired or optimal granule press frequency ($\omega$). Assuming that the granule press roller used in the operation has a diameter of about 0.5 m and provided an optimal or desired granule press frequency ($\omega$) of approximately 2 rad/sec, the required contact angle ($\theta$) may be calculated as a function of line speed (v) using the above equation. The results for various process line speeds are summarized in Table 1.

TABLE 1

Calculation of contact angle ($\theta$) for various line speeds (v).

| Line Speed | v(m/hr.) | 1400 | 1600 | 1800 | 2000 |
|---|---|---|---|---|---|
| Granule press pressure signal | $\omega$ (rad/s) | 2.00 | 2.00 | 2.00 | 2.00 |
| Granule press roll diameter | r(m) | 0.50 | 0.50 | 0.50 | 0.50 |
| Contact angle | $\theta$ (rad.) | 0.78$\pi$ | 0.89$\pi$ | $\pi$ | 1.11$\pi$ |

Table 1 shows that if the line speed (v) increases, the contact angle ($\theta$) needs to be increased in order to maintain a constant frequency ($\omega$) of the granule press pressure signal and granule press dwell time for optimal granule embedment. The amplitude of the pressure signal can be adjusted by adjusting the tension on the membrane, which may be used to control asphalt bleed through.

One advantage among many of decoupling the frequency ($\omega$) and amplitude of the granule press pressure signal from the line speed (v) as described above is improvement of granule adhesion and increase process robustness by lowering granule adhesion sensitivities to line speed, temperature and formulation variations. Another advantage is the tenability of the granule press process to specific operations, viscoelastic membranes, and the like.

Figure 3:
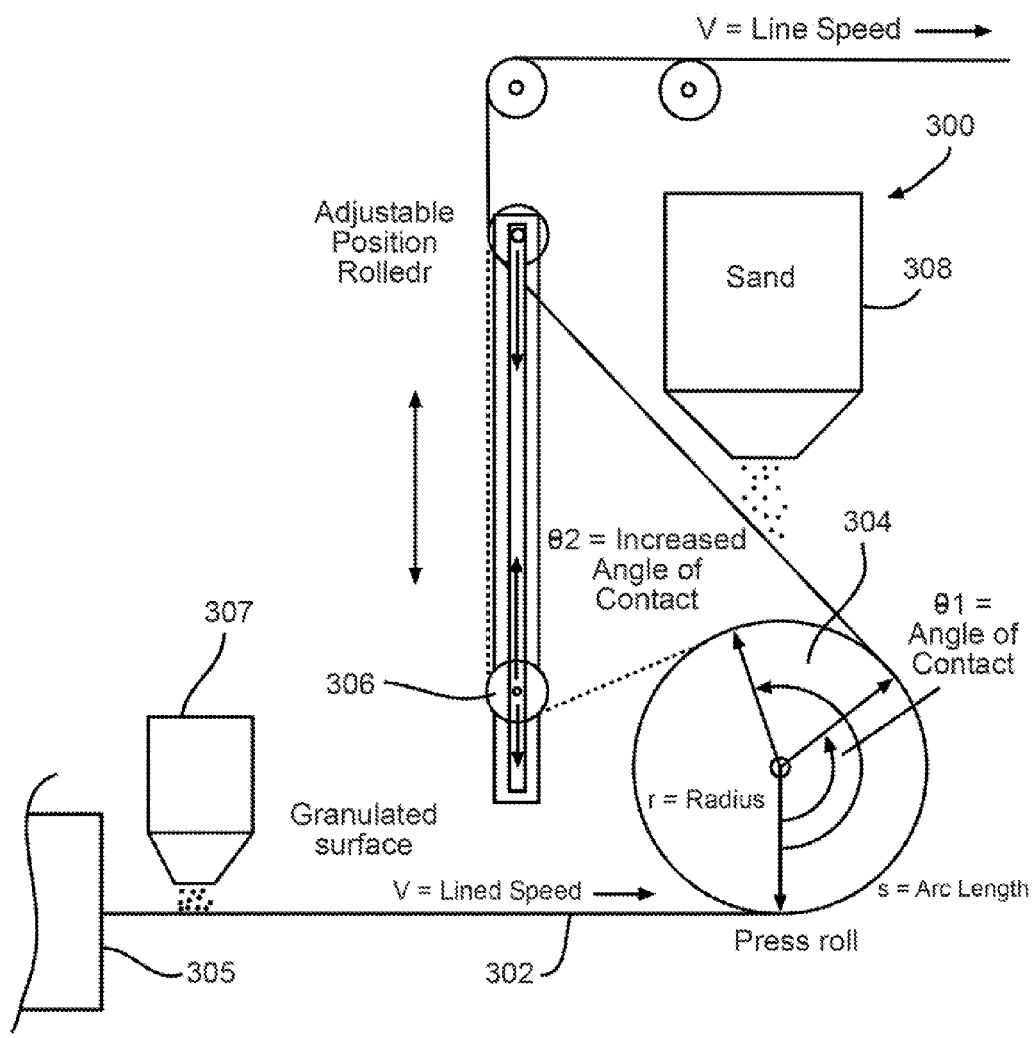
FIG. 3 illustrates a system designed to press granules into a roofing membrane with the dwell time of the granule pressure application process increased according to an embodiment of the invention.

Referring now to FIG. 3, illustrated is a granule processing system 300 that is designed to press granules into viscoelastic membranes 302 where the dwell time of the granule pressure application process is increased as described herein. System 300 achieves this increased dwell time by increasing the duration or amount of time that the membrane 302 and granules are in contact with a pressure wheel 304. In contrast to conventional process that provide high amplitude and short duration pressure curves as shown in FIG. 1, the increased duration of contact with the pressure wheel 304 ensures that a relatively even pressure is applied to the granules for a sufficient duration to drive the granules into the membrane 304. The pressure wheel 304 is also typically larger in diameter than conventional pressing wheels thereby increasing the contact duration compared with conventional wheel.

System 300 also includes an adjustable position roller 306 that allows the angle of contact, and thus the contact duration, to be adjusted. For example, roller 306 may be vertically adjusted relative to press roller 304 between a maximum top height that produces an angle of contact $\theta_1$ between the membrane 302, granules, and press roller 304, and a maximum bottom height that produces an angle of contact $\theta_1+\theta_2$ between the membrane 302, granules, and press roller 304. The increase in the angle of contact $\theta_2$ allows system 300 to be fine-tuned based on the properties of the membrane (e.g., temperature, viscoelasticity, amount of polymers or fillers, and the like), based on the line speed, based on a measure or desired frequency ($\omega$), based on the tension in membrane 302, and the like. Thus, even when granules are being pressed into two membranes having similar properties, roller 306 may be adjusted to fine tune the pressing process and account for small variations, such as variations in temperature or line speed. The resulting membranes may be relatively uniform in granule adhesion characteristics despite the small variations in the granule pressing process.

Figure 4:
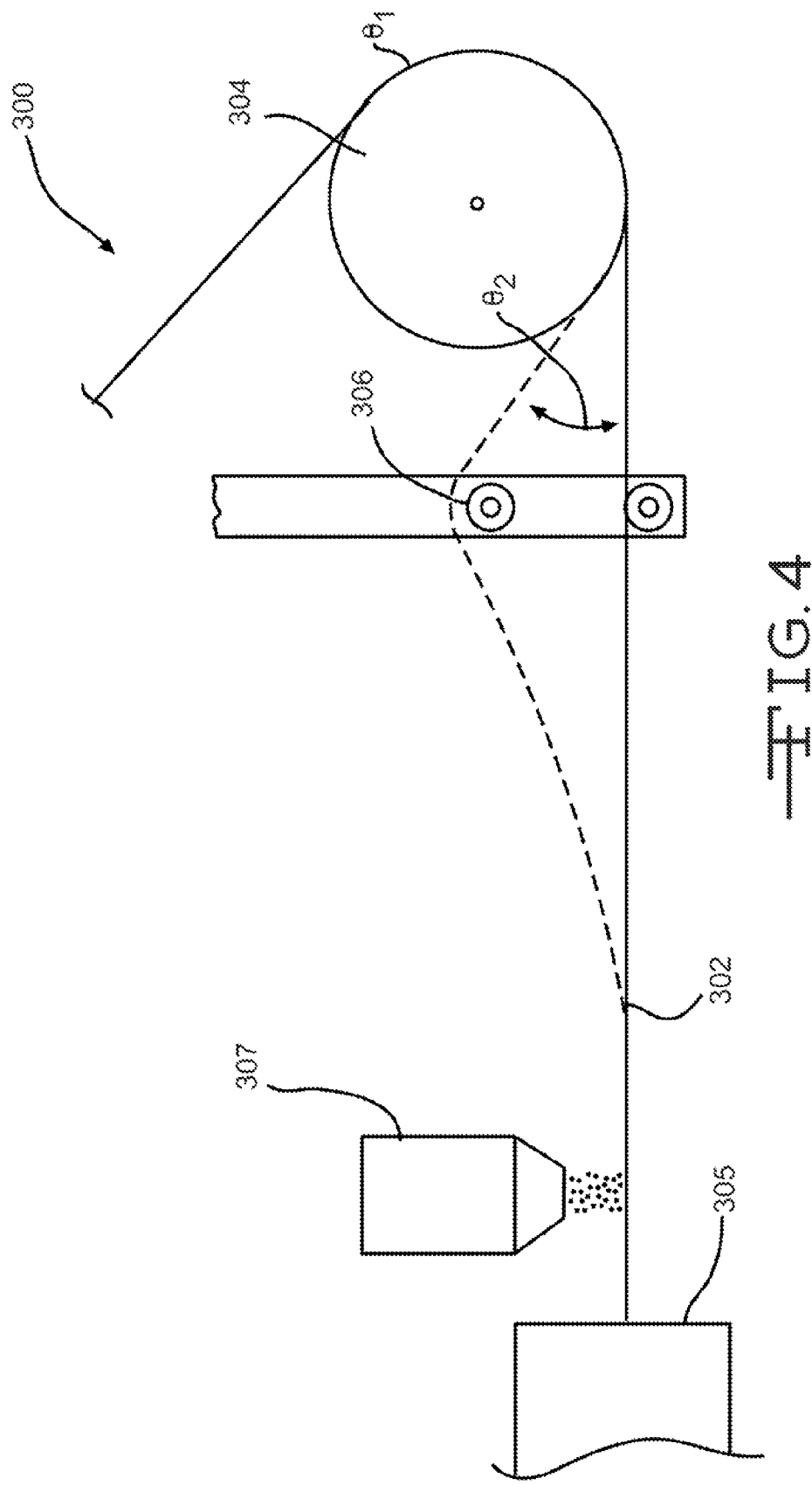
FIG. 4 illustrates the system of FIG. 3 with an adjustable roller positioned in front of a press roller so that a membrane passes over the adjustable roller before contacting the press roller according to an embodiment of the invention.

A typical operation of system 300 involves dispensing granules atop membrane 302 prior to the membrane and granules passing over press roller 304. The granules are commonly dispensed via a hopper 307 that is positioned along a path of the membrane proximally of press roller 304 and distally an extrusion device 305. Press roller 304 presses or drives the granules into the asphalt material of membrane 302 in the manner described herein. Additional material, such as a sand release agent, may be dispensed onto membrane 302 from one or more hoppers 308. Membrane 302 then passes over adjustable roller 306, and optionally one or more other rollers, en route to a final destination. One or more press rollers, such as those used in conventional systems, may be used to press the sand or other material into membrane 302 at a downstream process. These other press rollers, however, typically apply single point loads and are thus not as effective as press roller 304 at ensuring optimal granule adhesion for the reasons described herein. FIG. 4 illustrates granule processing system 300 with the adjustable roller 306 positioned in front of press roller 304 so that membrane 302 passes over adjustable roller 306 before contacting press roller 304.

Another advantage of system 300 is that the press roller 304 is positioned closer than many conventional press rollers to the granule dispensing hopper or device 307 and/or to where the membrane 302 is extruded 305. The membrane 302 is typically extruded at a temperature above 100° C. and commonly at a temperature above 150° C. The membrane 302 cools as it is routed along the various rollers after extrusion. Positioning press roller 304 closer to where the membrane 302 is extruded ensures that the membrane is likely to be hot when the membrane contacts the press roller, which facilitates in the granule pressing process (as shown in FIG. 2) and subsequent granule adhesion. In some embodiments, system 300 may be positioned away from extrusion device 305 such that the membrane 302 cools by a considerable or substantial amount before contacting press roller 304. An additional advantage of system 300 is that the increased dwell time effectively adheres the granules with membrane 302 even when the membrane experiences a considerable amount of cooling, which may result in the membrane exhibiting increased elastic behavior. Conventional point load press rollers are often ineffective at pressing granules into a membrane when such membranes experience considerable cooling.

As described above, a contact angle $\theta$ may be calculated based on the characteristics of the specific system 300 (i.e., the press roller 304 radius and the line speed (v)) and based on a calculated, determined, or desired frequency ($\omega$). The frequency ($\omega$) may be calculated by using or generating a chart, such as that shown in FIG. 2, and determining a sufficiently low resistance to deformation for the membrane and an angular frequency that corresponds to that value. In making this determination, a temperature of the membrane may be taken into consideration as described herein. If the calculated contact angle $\theta$ is greater than a lowest contact angle value $\theta_1$ of system 300, which is a contact angle produced when roller 306 is vertically adjusted to a maximum height, roller 306 may be adjusted vertically downward to increase the contact angle $\theta_1$ of system 300. The contact angle of system 300 may be adjusted to have any value between the lowest contact angle value $\theta_1$ and a maximum contact angle value of $\theta_1+\theta_2$. The maximum contact angle value $\theta_1+\theta_2$ is essentially only constrained by the adjustability of roller 306. The resolution or maximum adjustment angle $\theta_2$ may vary widely, but in one embodiment is between about 60 and 120 degrees, between about 75 and 105 degrees, between about 85 and 95 degrees, and is commonly about 90 degrees. The fine resolution of the contact angle adjustment allows system 300 to be tailored to essentially any type of membrane or pressing operation.

If the calculated contact angle $\theta$ is less than the lowest contact angle value $\theta_1$ of system 300, the line speed may be increased, the tension in membrane 302 reduced, or the radius of pressing wheel 304 reduced to increase the value of the contact angle $\theta$ to be about equal to or greater than $\theta_1$. In some embodiments, a contact angle $\theta$ of less than $\theta_1$ does not require any changes to the granule processing operation.

In some embodiments, the temperature of the membrane 302 may be controlled to facilitate in the granule pressing operation. For example, if the temperature of the membrane 302 is too cold so that the membrane is exhibiting elastic behavior, the membrane may be heated to raise the temperature so that the membrane exhibits less elastic behavior and/or increase plastic behavior. The membrane may be heated by raising the temperature of the material prior to extrusion and/or positioning one or more heaters, such as lights, that heat the membrane prior to press rolling. In another embodiment, variations in temperature may be accounted for by selecting a lower frequency ($\omega$) where the pressing operation is likely less affected by temperature variations.

While the dwell time typically depends on the properties of the membrane and the granule pressing operation, in one embodiment, the dwell time is between about 0.01 and 1.0 millisecond, between about 0.05 and 0.05 millisecond, or about 0.01 milliseconds. These value are exemplary only, however, and other values (shorter or longer durations) may be used depending on the specific materials and processing conditions. In one embodiment, press roller 304 may apply a pressure between about X and Y to press the granules into membrane 302. This pressure may be applied over a contact angle of at least 90 degrees, and more commonly over 120 degrees. When roller 306 is adjusted to increase the contact angle θ by up to the additional contact angle $θ_2$, this pressure may be applied over a contact angle of up to 180 or 210 degrees or more. In this manner, the single point load problem with conventional granule pressing processes is eliminated or greatly reduced. This configuration also allows the line speed to be increased without negatively affecting the granule pressing operation since the contact angle θ make be increased to account for the increased line speed. In this manner, the process time may be increased. The press roller 304 of system 300 is typically larger than conventional press rollers. In one embodiment, press roller 304 may be about 0.5 m in diameter, which is considerable larger than the press rollers of conventional systems, which may be 0.1 m in diameter or less. System 300 is not limited to these dimensions however, and virtually any sized press roller may be used.

Although not shown, in some embodiments, system 300 may include a computing device (or be communicatively coupled therewith) to calculate one or more of the parameters described above (e.g., θ, v, r, ω). Further, the computing device (not shown) may be used to implement any of the methods described herein, or any portion thereof. In some embodiments, the computing device may include one or more processors that are communicatively coupled with one or more memory devices, which may be internal and/or external to the computing system. The memory devices may include instructions or code, which cause the one or more processors to perform one or more of the method step operations described herein. The computing device may also receive input from and/or provide output to one or more other systems, users, external devices, and the like. The computing system may further communicate and/or be linked to one or more networks to route information and/or receive various input or instructions.

Figure 5:
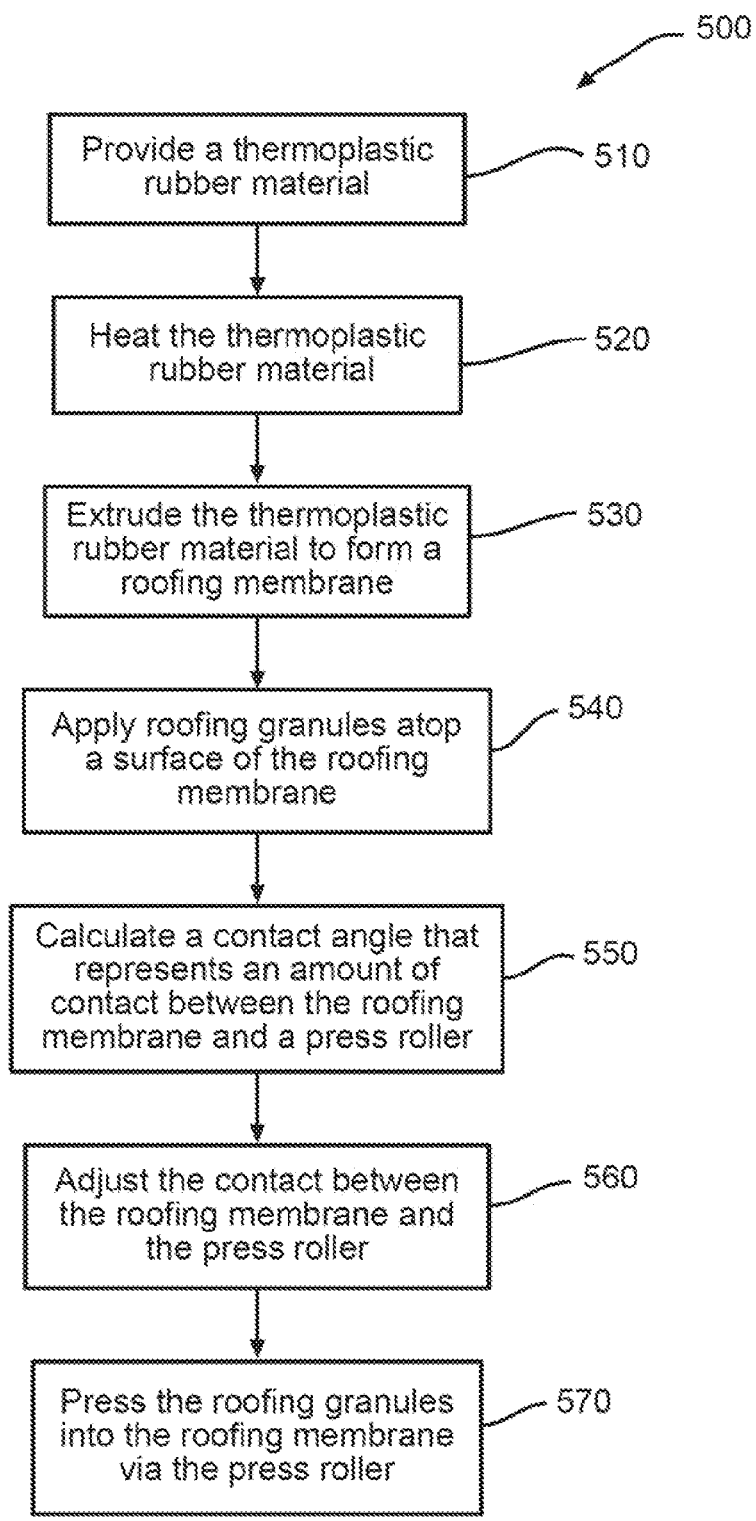
FIG. 5 illustrates a method for pressing roofing granules into a thermoplastic-rubber roofing membrane according to an embodiment of the invention.

Referring now to FIG. 5, illustrated is a method 500 for pressing roofing granules into a thermoplastic-rubber roofing membrane. At block 510 a thermoplastic rubber material may be provided. The thermoplastic rubber material may be similar to any of the material described herein. At block 520, the thermoplastic rubber material may be heated, such as to melt the thermoplastic rubber material. At block 530, the heated thermoplastic rubber material may be extruded (e.g., via extrusion device 305) to form a roofing membrane having a first surface and a second surface opposite the first surface (hereinafter roofing membrane). At block 540, roofing granules may be applied atop the first surface (e.g., via hopper 307).

At block 550, a contact angle may be calculated that represents an effective amount of contact between the roofing membrane and a press roller. In some embodiments, the contact angle may be calculated based on a line speed of the roofing membrane through a granule pressing system or operation. In some embodiments, the contact angle may additionally, or alternatively, be calculated based on an angular frequency of the press roller and/or a radius of the press roller. As described herein, the angular frequency of the press roller may be determined based on a temperature of the roofing membrane. In some embodiments, the angular frequency may be about 10.00 rad/sec or less, or about 1.00 rad/sec or less.

At block 560, the contact between the thermoplastic rubber membrane and the press roller may be adjusted so as to correspond to the effective amount of contact. In some embodiments, adjusting the contact between the thermoplastic rubber membrane and the press roller includes adjusting a position of a second roller (e.g., roller 306) relative to the press roller (e.g., roller 304). At block 570, the roofing granules may be pressed into the first surface of the thermoplastic rubber membrane via the press roller. In some embodiments, the radius of the press roller may be between about 0.25 and about 0.75 meters. In other embodiments, the press roller may be about 0.5 meters.

Figure 6:
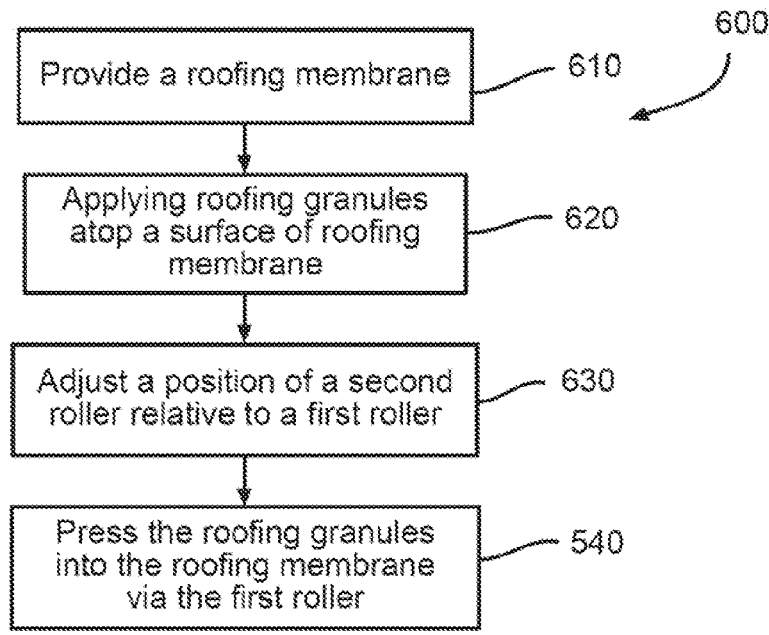
FIG. 6 illustrates a method for pressing roofing granules into a roofing membrane according to an embodiment of the invention.

Referring now to FIG. 6, illustrated is a method 600 for pressing roofing granules into a roofing membrane. At block 610, a roofing membrane is provided. The roofing membrane may be similar to any of the membranes described herein. At block 620, roofing granules are applied atop a surface of the roofing membrane. At block 630, a position of a second roller is adjusted relative to a first roller so as to vary an amount of contact between the roofing membrane and the first roller. At block 640, the roofing granules are pressed into the roofing membrane via the first roller.

In some embodiments, method 600 may also include the steps of: determining a line speed of the roofing membrane through a granule press system, calculating a contact value based on the line speed of the roofing membrane, where the contact value represents an effective amount of contact between the roofing membrane and the first roller, and adjusting the position of the second roller so that the amount of contact between the roofing membrane and the first roller corresponds to the effective amount of contact. In some embodiments, method 600 may further include: determining an angular frequency of the first roller and calculating the contact value based additionally on the angular frequency of the first roller.

Figure 7:
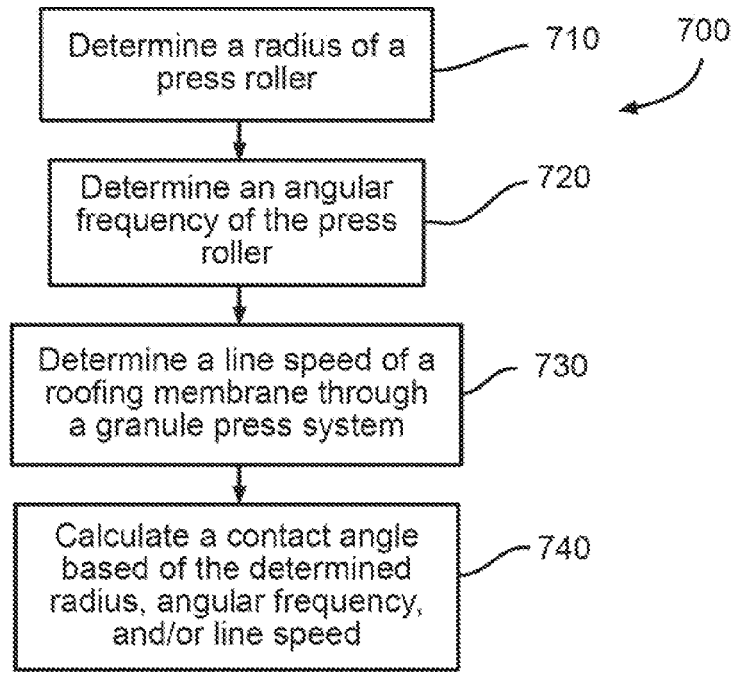
FIG. 7 illustrates a method for determining a contact angle for pressing roofing granules into a roofing membrane according to an embodiment of the invention.

Referring now to FIG. 7, illustrated is a method 700 for determining a contact angle for pressing roofing granules into a roofing membrane. At block 710, a radius of a press roller is determined. As described herein, the press roller is used to press roofing granules into the roofing membrane. At block 720, an angular frequency of the press roller is determined. At block 730, a line speed of the roofing membrane through a granule pressing system is determined. At block 740, the contact angle is calculated based on the radius of the press roller, the angular frequency of the press roller, and/or the line speed of the roofing membrane. As described herein, the contact angle defines or represents an amount of contact the roofing membrane should have with the press roller to effectively press the granules into the roofing membrane. In some embodiments, the angular frequency of the press roller may be determined based on the temperature of the roofing membrane.

EXAMPLES

Referring to Table 2 below, provided is data from an experiment that shows that increasing the temperature and/or increasing the granule press dwell time (i.e. decreasing the frequency (ω) of the granule press pressure signal) result in significant improvements to granule adhesion per ASTM D 4977-89. The improvement in granule adhesion was measured based on a reduction in granule loss with most test samples exhibiting a 90% or more reduction in granule loss compared to a control sample. The experiment was conducted by re-pressing the granules of typical SBS membrane in a lab setting. The experiment shows the viability of increasing the granule press dwell time (i.e. decreasing the frequency (ω) of the granule press pressure signal).

TABLE 2

Results of a granule adhesion experiment

| Re-Pressing Temperature (° C.)[a] | Granule Re-Pressing Dwell Time (min)[a] | Granule Loss (g)-ASTM D 4977-89[b] | Reduction in granule loss (%) |
|---|---|---|---|
| None-control sample | None-control sample | 0.9 ± 0.3 | — |
| 120 | 5 | — | Asphalt bleed through |
| 120 + spacer | 5 | 0.09 | 90 |
| 115 | 5 | 0.10 | 89 |
| 115 | 10 | 0.05 | 94 |
| 110 | 10 | 0.11 | 88 |
| 110 | 15 | 0.26 | 71 |

All the samples were roughly 10 inch by 10 inch specimen. The control sample, which was not heated or re-pressed, exhibited a granule loss of approximately 0.9±0.3. At a temperature of approximately 120° C. and with a re-pressing dwell time of approximately 5 minutes, the first test sample exhibited asphalt bleed through, which indicates that the membrane material was too soft and/or the pressing operation too long. A second test sample was run under the approximate same conditions with a spacer that limited the pressure applied during the re-pressing process and a granule loss of approximately 0.09 was measured, which corresponds to approximately a 90% reduction in granule loss. A third test sample was heated to approximately 115° C. and a re-pressing dwell time of approximately 5 minutes was used, which resulted in a granule loss of approximately 0.10 corresponding to an approximately 89% reduction in granule loss. A fourth test sample was heated to approximately 115° C. and a re-pressing dwell time of approximately 10 minutes was used, which resulted in a granule loss of approximately 0.05 corresponding to an approximately 94% reduction in granule loss. A fifth and sixth sample were heated to approximately 110° C. and a re-pressing dwell time of respectively 10 and 15 minutes were used, which resulted in respective granule losses of 0.11 and 0.26, or respectively 88% and 71% reduction in granule loss. A spacer was not used for test samples three through six. These results show that significant reductions in granule loss are possible by increasing the dwell time and/or temperature of the granule pressing operation.

While the embodiments described herein typically refer to the process being applied to viscoelastic materials, such as SBS Modified Bitumen Roofing Membranes, polymer modified asphalt, rubber modified asphalt, thermoplastic rubbers, modified thermoplastic rubbers, and the like, the process is not limited to these materials. For example, the increased dwell time and press roller concepts described herein may be applied to conventional membranes in a granule pressing process in order to speed up these processes. For example, the dwell time of the pressing operation may be increased as described herein so that the line speed may be increased while the pressure applied to the membrane is kept relatively the same. Accordingly, the concepts described herein may be applied to essentially any granule pressing operation.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the device" includes reference to one or more devices and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A method for pressing roofing granules into a thermoplastic-rubber roofing membrane comprising:
   providing a thermoplastic rubber material;
   heating the thermoplastic rubber material;
   extruding the thermoplastic rubber material to form a membrane having a first surface and a second surface opposite the first surface;
   applying roofing granules atop the first surface;
   calculating a contact angle that represents an amount of contact between the thermoplastic rubber membrane and a press roller, the contact angle being calculated based on a line speed of the thermoplastic rubber membrane through a granule pressing system;
   adjusting the contact between the thermoplastic rubber membrane and the press roller so as to correspond to the calculated amount of contact; and
   pressing the roofing granules into the first surface of the thermoplastic rubber membrane via the press roller.

2. The method of claim 1, wherein the contact angle is further calculated based on an angular frequency of the press roller.

3. The method of claim 2, wherein the angular frequency is determined based on a temperature of the thermoplastic rubber sheet.

4. The method of claim 2, wherein the angular frequency is 10.00 rad/sec or less.

5. The method of claim 4, wherein the angular frequency is 1.00 rad/sec or less.

6. The method of claim 1, wherein adjusting the contact between the thermoplastic rubber membrane and the press roller comprises adjusting a position of a second roller relative to the press roller.

7. The method of claim 1, wherein the contact angle is further calculated based on a radius of the press roller.

8. The method of claim 7, wherein the radius of the press roller is between about 0.25 and about 0.75 meters.

9. A method for pressing roofing granules into a roofing membrane comprising:
   providing a roofing membrane;

applying roofing granules atop a surface of the roofing membrane;

adjusting a position of a second roller relative to a first roller so as to vary an amount of contact between the roofing membrane and the first roller; and pressing the roofing granules into the roofing membrane via the first roller.

10. The method of claim 9, further comprising:

determining a line speed of the roofing membrane through a granule press system;

calculating a contact value based on the line speed of the roofing membrane, the contact value representing an amount of contact between the roofing membrane and the first roller; and adjusting the position of the second roller so that the amount of contact between the roofing membrane and the first roller corresponds to the calculated amount of contact.

11. The method of claim 10, further comprising:

determining an angular frequency of the first roller; and calculating the contact value based additionally on the angular frequency of the first roller.

\* \* \* \* \*